United States Patent
Dolfini et al.

(10) Patent No.: US 8,559,884 B2
(45) Date of Patent: Oct. 15, 2013

(54) METHOD AND SYSTEM FOR DETERMINING THE CONTEXT OF AN ENTITY

(75) Inventors: Danilo Dolfini, Turin (IT); Marco Marengo, Turin (IT); Nicoletta Salis, Turin (IT)

(73) Assignee: Telecom Italia S.p.A., Milan (IT)

( * ) Notice: Subject to any disclaimer, the term of this patent is extended or adjusted under 35 U.S.C. 154(b) by 242 days.

(21) Appl. No.: 13/123,185

(22) PCT Filed: Oct. 10, 2008

(86) PCT No.: PCT/EP2008/008596
§ 371 (c)(1),
(2), (4) Date: Apr. 7, 2011

(87) PCT Pub. No.: WO2010/040375
PCT Pub. Date: Apr. 15, 2010

(65) Prior Publication Data
US 2011/0201280 A1    Aug. 18, 2011

(51) Int. Cl.
*H04W 24/00* (2009.01)
(52) U.S. Cl.
USPC ............... 455/67.11; 455/41.1; 455/456.1
(58) Field of Classification Search
USPC ............ 455/41.1, 452.1, 452.2, 456.1, 563.2, 455/456.3, 456.5, 456.6, 67.11
See application file for complete search history.

(56) References Cited

U.S. PATENT DOCUMENTS

| 7,043,255 | B1  | 5/2006  | Tiwari |
| 7,822,410 | B2* | 10/2010 | Coppinger et al. ........... 455/419 |
| 7,962,137 | B2* | 6/2011  | Coppinger et al. ........ 455/435.2 |
| 8,346,872 | B2* | 1/2013  | Cohen et al. .................. 709/206 |
| 2002/0133545 | A1 | 9/2002 | Fano et al. |
| 2002/0151297 | A1* | 10/2002 | Remboski et al. ............ 455/414 |
| 2002/0173295 | A1 | 11/2002 | Nykanen et al. |
| 2005/0136903 | A1* | 6/2005 | Kashima et al. .............. 455/418 |

(Continued)

FOREIGN PATENT DOCUMENTS

| WO | WO 02/093877 A1 | 11/2002 |
| WO | WO 03/054654 A2 | 7/2003 |
| WO | WO 2004/089006 A2 | 10/2004 |

OTHER PUBLICATIONS

International Search Report from the European Patent Office for International Application No. PCT/EP2008/008596, mailing date Jul. 3, 2009.

*Primary Examiner* — Cong Tran
(74) *Attorney, Agent, or Firm* — Finnegan, Henderson, Farabow, Garrett & Dunner, L.L.P.

(57) ABSTRACT

Method for providing information on a context parameter relating to a consumer device of a telecommunication system which includes a plurality of provider devices. The method includes: a) checking if data relevant to the context parameter are available for the consumer device; b) in the positive case of a), obtaining the information on the context parameter relating to the consumer device based upon the available data; c) in the negative case of a), checking, according to predetermined proximity rules, if among the plurality of provider devices, there is at least one nearby provider device that, with regard to the context parameter, is in the proximity of the consumer device; d) in the positive case of c), checking if data useful to determine the information on the context parameter relating to the consumer device are available for the at least one nearby provider device, and e) in the positive case of d), determining the context information on the consumer device based upon the data available for the at least one nearby provider device.

14 Claims, 5 Drawing Sheets

(56) References Cited

U.S. PATENT DOCUMENTS

| | | |
|---|---|---|
| 2006/0053378 A1 | 3/2006 | Fano et al. |
| 2007/0232274 A1* | 10/2007 | Jung et al. .................. 455/412.1 |
| 2008/0005681 A1* | 1/2008 | Cohen et al. .................. 715/762 |
| 2008/0139114 A1* | 6/2008 | Ranganathan ............... 455/41.1 |
| 2009/0075669 A1* | 3/2009 | Franceschini et al. ..... 455/452.2 |
| 2009/0117881 A1* | 5/2009 | Deshpande ................. 455/414.1 |
| 2010/0042469 A1* | 2/2010 | Chandrasekar et al. ........ 705/10 |
| 2012/0144403 A1* | 6/2012 | Hacigumus et al. .......... 719/313 |

* cited by examiner

METHOD AND SYSTEM FOR DETERMINING THE CONTEXT OF AN ENTITY

CROSS REFERENCE TO RELATED APPLICATION

This application is a national phase application based on PCT/EP2008/008596, filed Oct. 10, 2008, the content of which is incorporated herein by reference.

BACKGROUND OF THE INVENTION

1. Field of the Invention

The present invention relates to the provision of context-based services.

2. Description of the Related Art

U.S. Pat. No. 7,043,255 discloses a system to provide location-relevant and time-sensitive information services to businesses and organizations managing mobile resources.

WO 2004/089006 discloses a mobile station for managing context-related information. The mobile station includes or is associated with one or more sensors for sensing ambient conditions of the mobile user and of the mobile station operated by the mobile user. The sensors are capable of processing the sensed data into "context atoms" (that is, into a specific piece of context-related information). The mobile station further comprises a context engine for receiving, storing and providing access to the context atoms. Once stored in the mobile station, context atoms are retrieved by entities referred to as "context consumers". Once a context consumer retrieves one or more context atoms, the context consumer can utilize the context atoms to determine a context of the mobile station (or of the user of the mobile station) so as to operate the mobile station based upon the determined context or to provide the user with information services based upon the determined context.

WO 03/054654 discloses a location based recommendation system and method wherein: the location of a wireless device is determined; a Novelty Index Value (NIV)—indicating how novel is for a wireless device to occupy the determined location—is calculated for the location; and user context is utilized along with NIV values to provide context-based services to the user.

SUMMARY OF THE INVENTION

The Applicant notes that to access context-based services a device typically needs to be equipped or to be associated with sensors capable of acquiring data that can be used to determine context parameters on the device or on the user operating the device. As the number/type of sensors associated with a device increases, the context parameters that can be obtained relatively to the device (or user of the device) widens. In particular, the higher the number/type of sensors associated with a device, the higher is the number of context-based services that can be provided to the user of the device.

The Applicant faced the technical problem of enhancing the capacity of providing context-based services to a user. In particular, the Applicant faced the technical problem of giving users the possibility of taking advantage of context-based services beyond the number and type of sensors associated with the user's devices.

The Applicant found that this problem can be solved through a method for providing information on a context parameter relating to a consumer device of a telecommunication system, the telecommunication system also comprising a plurality of provider devices and the method comprising:

a) checking if data relevant to the context parameter are available for the consumer device;
b) in the positive case of a), obtaining the information on the context parameter relating to the consumer device based upon the available data;
c) in the negative case of a), checking, according to predetermined proximity rules, if among the plurality of provider devices there is at least one nearby provider device that, with regard to said context parameter, is in the proximity of the consumer device;
d) in the positive case of c), checking if data useful to determine the information on the context parameter relating to the consumer device are available for said at least one nearby provider device,
e) in the positive case of d), determining the context information on the consumer device based upon the data available for said at least one nearby provider device.

In the present description and claims, the expression:

"proximity" is used to indicate a physical or logical proximity between two devices, which is established according to predetermined proximity rules that depend upon the context parameter under consideration. For example, according to exemplarily proximity rules, a device X, which is 1 Km faraway from device Y, can be considered in the proximity of device Y as far as the city weather forecast context parameter concerns. With regard to an indoor ambient temperature context parameter, instead, device X can be considered not in the proximity of device Y;

"nearby device" is used to indicate a provider device that, with regard to a predetermined context parameter, is considered to be in the proximity of a consumer device according to predetermined proximity rules;

"context parameter relating to a device" is used to indicate any parameter that can be used to characterize a situation of the device and/or user operating the device. For example, a context parameter can relate to location (absolute position, relative position, co-location, . . . ), ambient climatic conditions, ambient pollution conditions, traffic conditions, user's habits, user's business commitments, user's working hours, user's buddy lists and relationships, user's calendar entries, network resources, network connection quality, and similar;

"consumer device" is used to indicate a device adapted to take advantage, directly or through the intermediation of another entity (as, for example, a context-based service provider), of information on context parameters known for a provider device;

"provider device" is used to indicate a device potentially adapted to place information on at least one context parameter, known for it, at disposal of a consumer device.

It is noted that even if in the description and claims consumer devices are disclosed as playing a "consumer" role and provider devices are disclosed as playing a "provider" role, according to the invention, consumer devices and provider devices may be adapted to act also in both roles, at the same time or at different times.

According to the method of the invention, when data relevant to a context parameter relating to a consumer device A are not available—for example because device A is not equipped (or associated) with a sensor adapted to acquire data relevant to said context parameter or because the sensor is momentarily not operative—information on the context parameter relating to the consumer device A can be determined as well if, with regard to said context parameter, there is at least one nearby provider device that can be considered in the proximity of consumer device A for which data useful to determine said information are available.

The capacity of providing context-based services to a user is thus enhanced and the users are given the possibility of taking advantage of context-based services beyond the number and type of sensors associated with the user's devices.

Advantageously, the consumer device is associated with proximity-relevant information that can be useful to determine a proximity relationship between the consumer device and another device of the plurality of provider devices.

Advantageously, the plurality of provider devices are associated each with proximity-relevant information that can be useful to determine a proximity relationship between the corresponding device and another device.

Examples of proximity-relevant information can be telecommunication identifiers/addresses as an IP address, a GPS identifier, a Bluetooth identifier, a Wi-Fi identifier, a WiMAX identifier, a NFC identifier, a GSM/UMTS cell identifier and similar.

Advantageously, the consumer device and (at least part of) the plurality of provider devices comprise each at least one (hardware and/or software) proximity-indicator element that allows associating with the corresponding device proximity-relevant information that can be useful to determine a proximity relationship between the corresponding device and another device.

For example, a proximity-indicator element can be a protocol stack as, for example, a GPS chip, a communication protocol stack as, for example, a network card/interface (e.g. Ethernet card/interface), and/or a communication protocol radio stack as, for example, a Bluetooth stack, a Wi-Fi stack, a WiMAX stack, a NFC (near Field Communication) stack or a GSM/UMTS stack.

Advantageously, step c) comprises determining proximity relationships between the consumer device and the provider devices by using the proximity-relevant information associated with them. Advantageously, in step c) the proximity rules are applied to establish if, taking into account the determined proximity relationships, there is at least one nearby provider device that, with regard to the context parameter, can be considered in the proximity of the consumer device.

The check in step a) can for example be performed by checking if data relevant to the context parameter relating to the consumer device are stored in a context repository for said consumer device and/or by checking if said consumer device is equipped or associated with a suitable context sensor adapted to acquire said data.

Advantageously, at least one device of the plurality of provider devices is equipped or associated with at least one context sensor adapted to acquire data indicative of at least one context parameter relating to it or to the user operating it.

Preferably, the plurality of provider devices is equipped or associated with at least one context sensor adapted to acquire data indicative of at least one context parameter relating to them or to the user operating them.

Advantageously, the consumer device is equipped or associated with at least one context sensor adapted to acquire data indicative of at least one context parameter relating to the consumer device or to the user operating it.

The check in step d) can, for example, be performed by checking if data useful to determine the information on the context parameter relating to the consumer device are stored in a context repository for said at least one nearby provider device and/or by checking if said at least one nearby provider device is equipped or associated with a suitable sensor adapted to acquire said data.

Advantageously, the method further comprises a step c1) of checking if predetermined propagation criteria are met for the at least one nearby provider device in the proximity of the consumer device. Preferably, steps d) and e) are performed in the positive case of step c1). The propagation criteria can, for example, take into account predetermined privacy policies, user preferences, accuracy conditions and similar.

Advantageously, steps c), d) and e) are performed also in the positive case of step a).

Advantageously, the consumer device and the provider devices are subscriber devices, operated by a subscriber of the telecommunication system for accessing telecommunications services (e.g., context-based services) provided by an operator of the telecommunication system.

Typically, the consumer device and the provider devices are telecommunications subscriber devices, adapted to enable the users operating the devices to communicate with one another through the telecommunications system.

Advantageously, e) further comprises determining the accuracy of the determined information.

In a second aspect thereof, the present invention relates to a context platform of a telecommunication system, the context platform comprising:

modules adapted to receive from an entity a request for information on a context parameter relating to a consumer device of the telecommunication system;

modules adapted to check if data relevant to the context parameter are available for the consumer device; in the positive case, to obtain the information on the context parameter relating to the consumer device based upon the available data and to provide the entity with the obtained information;

modules adapted to store and apply predetermined proximity rules to check if, among a plurality of provider devices of the telecommunication system, there is at least one nearby provider device that, with regard to said context parameter, is in the proximity of the consumer device;

modules adapted to check if data useful to determine the information on the context parameter relating to the consumer device are available for said at least one nearby provider device; to determine, in the positive case, the context information on the consumer device based upon the data available for said at least one nearby provider device and to provide the entity with the context information on the consumer device so determined.

Advantageously, the context platform further comprises modules adapted to keep proximity-relevant information associated with the consumer device and the plurality of provider devices up-to-date.

Advantageously, the context platform further comprises modules adapted to determine proximity relationships between the consumer device and the plurality of provider devices based upon said proximity-relevant information associated with them.

As far as further features of this aspect of the invention are concerned, reference is made to what disclosed above with reference to the first aspect of the invention.

In a third aspect thereof, the present invention relates to a telecommunication system comprising at least one consumer device, a plurality of provider devices and a context platform according to the second aspect of the invention.

Advantageously, the telecommunication system further comprises a network (that can be wired and/or wireless) to put the consumer device, the plurality of provider devices and the context platform in communication with one another.

Advantageously, the telecommunication system further comprises a context-based service provider.

As far as further features of this aspect of the invention are concerned, reference is made to what disclosed above with reference to the other aspects of the invention.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein.

DETAILED DESCRIPTION OF THE INVENTION

Figure 1:
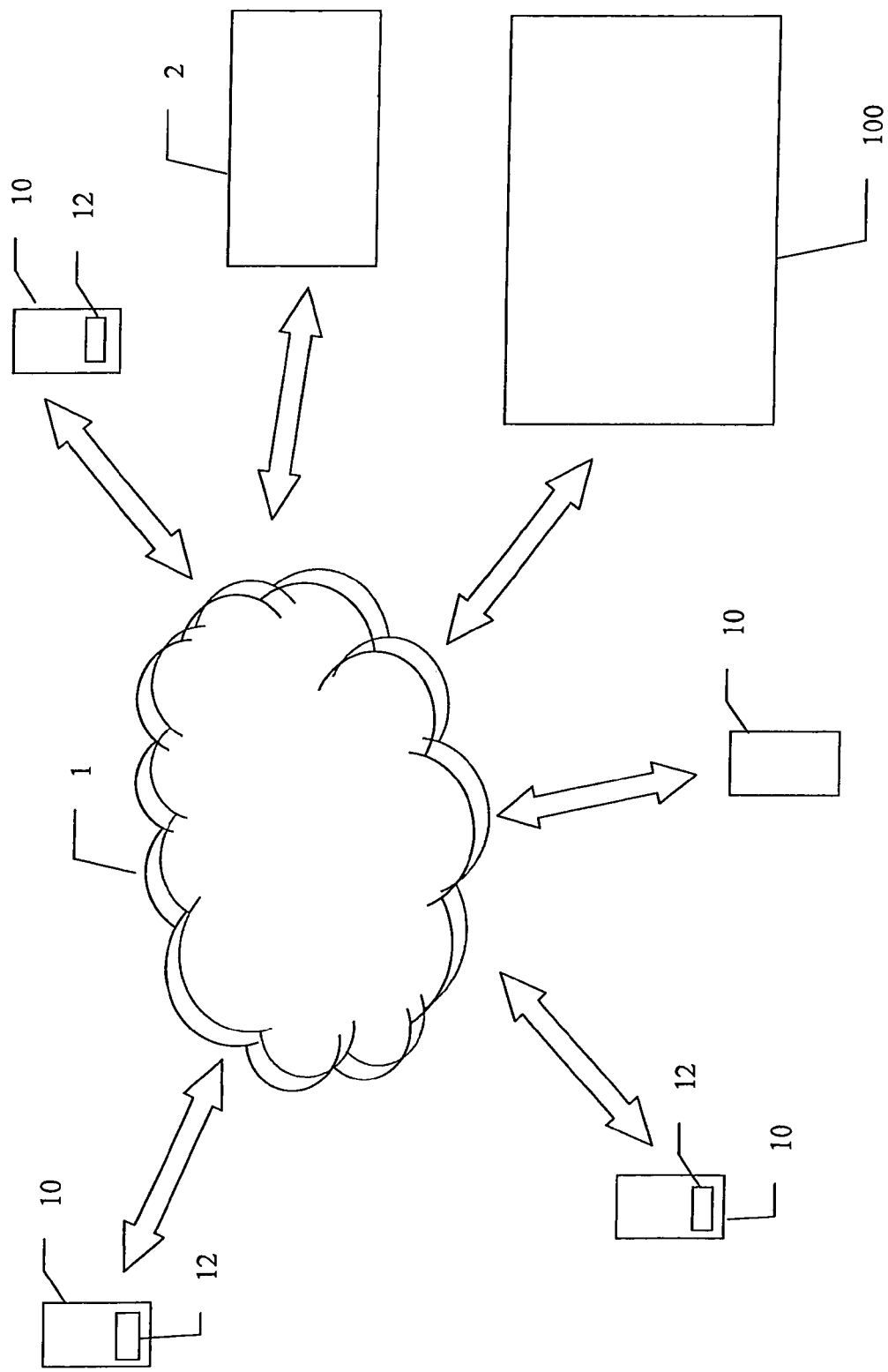
FIG. 1 schematically shows a telecommunication system according to an embodiment of the invention.

FIG. 1 discloses a telecommunication system comprising a plurality of devices 10, a network 1, a service provider 2 and a context platform 100.

The devices 10 can be subscriber devices, operated by subscribers of the telecommunication system for accessing telecommunications services (e.g., context-based services) provided by an operator of the telecommunication system. Typically, they are telecommunications subscriber devices, adapted to enable the users operating the devices to communicate with one another through the telecommunications system.

For example, the devices 10 comprise user devices as telephone sets, IP (Internet Protocol) phones, cellular or mobile phones, mobile TV sets, personal computers, personal digital assistant (PDA) and similar.

The network 1 typically comprises one or more local and/or wide area networks, which may be wired and/or wireless networks, such as a cellular network, a packet-switched data network, a public switched telephone network, the Internet, and similar.

The service provider 2 may be any type of service provider adapted to provide context-based services.

The devices 10, the service provider 2 and the context platform 100 are adapted to communicate through the network 1.

The devices 10, the service provider 2 and the context platform 100 can be connected to the network 1 via a wireless link, wired link or a combination thereof, according to techniques known in the art. Typical examples of wireless technologies are Bluetooth, Wi-Fi, Wi-Max, NFC, UMTS, GSM/GPRS and similar technologies.

At least one of the devices 10 is equipped or associated with at least one context sensor (not shown in the figures) adapted to acquire data indicative of at least one context parameter relating to the device or the user of the device.

The context sensor may exemplarily be a traffic sensor, a pollution sensor, an ambient light sensor, an audio sensor, a three-axis acceleration sensor, an ambient (indoor/outdoor) temperature sensor, a positioning sensor (e.g., a GPS localization device capable of determining the longitudinal and latitudinal directions of the device or a GSM stack enabling the GSM cell wherein the device is located to be determined).

In FIG. 1 it is assumed that part of devices 10 comprises at least one context sensor and a local context module (on the whole depicted by the reference number 12). The context module is adapted to send the data acquired by the context sensor(s) of the respective device 10 to the context platform 100. The data may be sent from the device 10 to the context platform 100 periodically and/or by request of the context platform 100.

Figure 2:
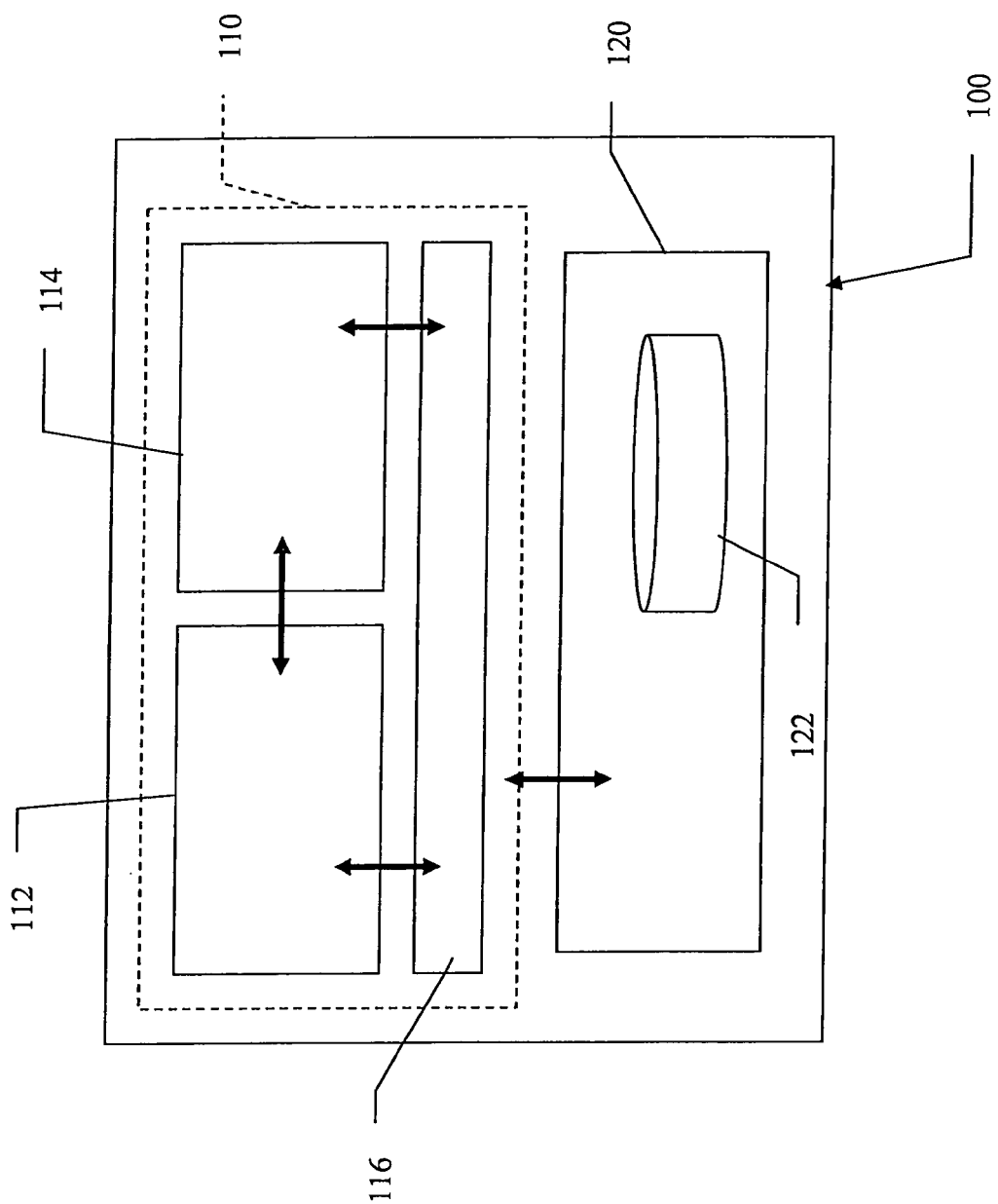
FIG. 2 schematically shows a context platform according to an embodiment of the invention.

In FIG. 2, the context platform 100 comprises a context propagation provider 110 and a context broker 120. The context propagation provider 110 comprises a propagation module 112, a proximity module 114 and a notification handler 116.

As explain in more detail below, the proximity module 114 is adapted to keep proximity-relevant information associated with the devices 10 of the telecommunication system up-to-date and the propagation module 112 is adapted to store and apply predetermined proximity rules and propagation criteria.

The notification handler 116 is adapted to handle communications between the context propagation provider 110 and the context broker 120.

The context broker 120 is adapted to determine and store, according to techniques known in the art, information on context parameters relating to devices 10 based upon the data acquired by the context sensors associated therewith and, optionally, upon data provided by the network 1.

The context broker 120 comprises a context repository 122 for storing information about the context parameters determined for devices 10.

The context platform 100 and, in particular, the propagation module 112, the proximity module 114, the notification handler 116 and the context broker 120 are adapted to implement the invention, in the various aspects thereof, as described in more detail hereinafter, with reference to FIGS. 3 to 5.

According to the invention, when information on a specific context parameter relating to a device 10 (in the following referred to as consumer device) is needed, a corresponding request is sent to the context platform 100 from a requesting entity. The requesting entity can exemplarily be the consumer device 10 (e.g., a suitable software application running on the consumer device 10), the service provider 2 or a suitable software application running on the context platform 100 itself.

Figure 3:
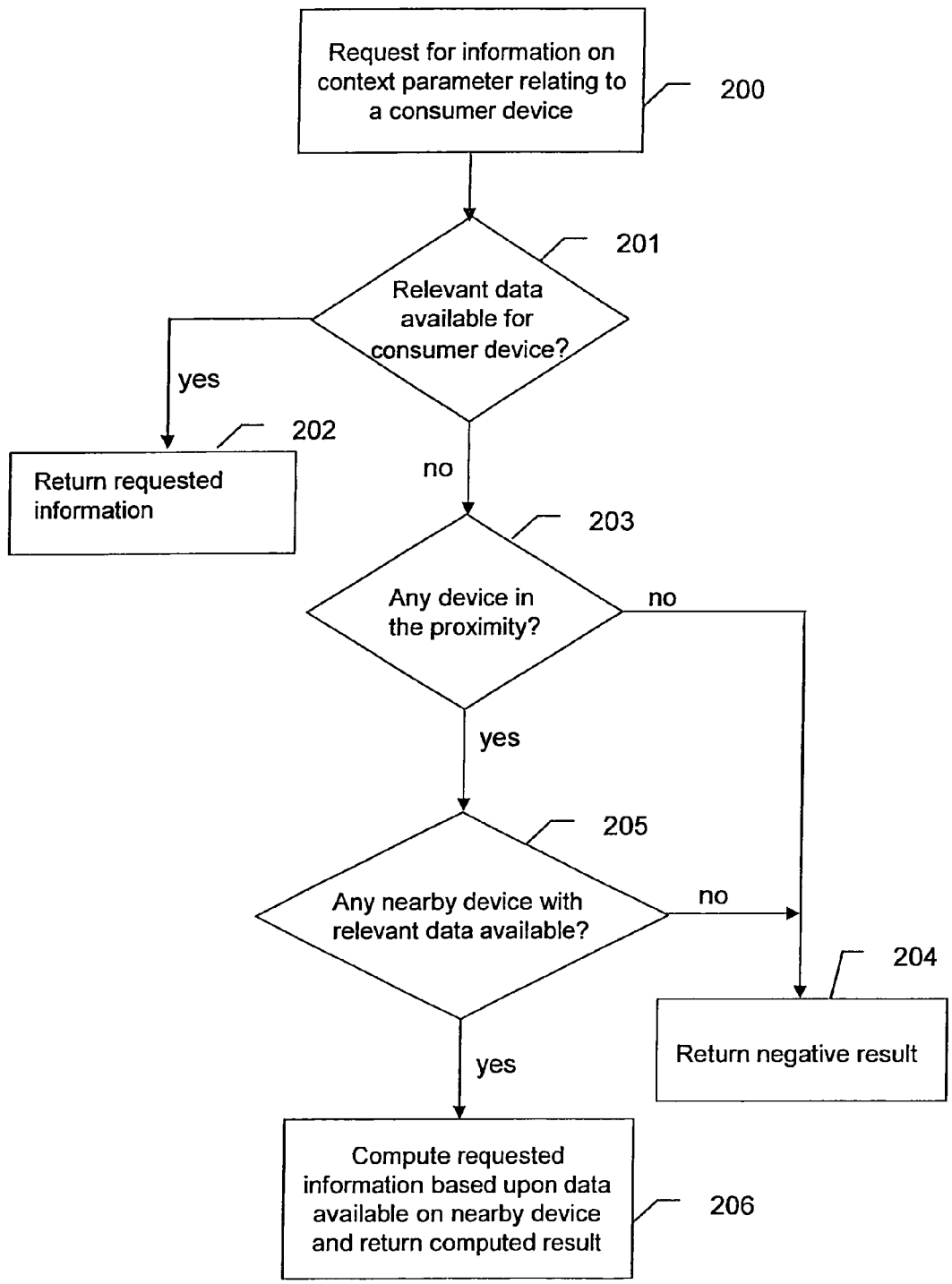
FIG. 3 schematically shows a flow chart outlining the main actions carried out to determine information on a context parameter relating to a consumer device according to an embodiment of the invention.

As schematically shown in the flowchart of FIG. 3, at block 200 the context platform 100 receives the request.

At block 201 the context platform 100 checks if the requested information on the specific context parameter relating to the consumer device 10 (e.g., the value of the ambient temperature in the surroundings of device 10) is available for the consumer device 10.

The check may, for example, be performed by checking if the consumer device 10 is equipped or associated with a suitable sensor (e.g., an outdoor ambient temperature sensor) adapted to acquire data relevant to the requested information or by checking if the context repository 122 already stores the requested information for the consumer device 10.

In the positive case of block 201, the context platform 100 gets the requested information and returns it to the requesting entity (block 202). The information can be obtained from the local context module 12 of the consumer device 10 or retrieved from the context repository 122.

In the negative case of block 201, the context platform 100 checks if, relevantly to the context parameter for which information has been requested, there is at least one device 10 (in the following referred to as nearby provider device) of the telecommunication system, which can be considered in the proximity of the consumer device 10 according to predetermined proximity rules (203).

In the negative case of block 203, the context platform 100 returns the negative result to the requesting entity (block 204).

In the positive case of block 203, the context platform 100 checks if data relevant to the requested information are available for said at least one nearby provider device 10 (block 205).

The check may be performed by checking if said at least one nearby provider device 10 is equipped or associated with a suitable context sensor (e.g., an ambient temperature sensor), which is adapted to acquire data useful to determine the requested information on the context parameter relating to the consumer device 10 or by checking if the context repository 122 already stores the relevant data for said at least one nearby provider device 10.

According to a preferred embodiment (not shown in the figures), the check at block 205 is performed if predetermined propagation criteria are met for said at least one nearby provider device 10. For example, the propagation criteria can take into account predetermined privacy policies, user preferences, and similar. If the propagation criteria are not met, a negative result is returned to the requesting entity.

When the check at block 205 is negative, the context platform 100 returns the negative result to the requesting entity (block 204).

When the check at block 205 is positive, the context platform 100 gets the useful data for the at least one nearby provider device 10 (block 206), for example by obtaining them from the local context module 12 of the at least one nearby provider device 10 or by retrieving them from the context repository 122. Moreover, at block 206 the context platform computes a result for the requested information based upon the relevant data obtained for said at least one nearby provider device and returns the computed result to the requesting entity.

According to a preferred embodiment (not shown in the figures), at block 202 the context platform 100 can also be adapted to execute, subject to predetermined decision rules, actions at blocks 203 to 206 before returning the requested information to the requesting entity.

This can give the possibility of enhancing the information returned to the requesting entity. In fact, given, for example:
  a consumer device A having a Bluetooth stack for which information about a list A of discovered devices is available, and
  a device B, which can be considered in the proximity of consumer device A and has a Bluetooth stack with a list B of discovered devices,
the list A of devices discovered by consumer device A can be suitably enhanced, before returning it to the requesting entity, by using data from the list B (and vice versa).

Advantageously, at block 206 the context platform 100 is also adapted to calculate, if required, the accuracy of the computed result and to return it to the requesting entity, together with the computed result. According to an embodiment, the computed result may be returned to the requesting entity if the calculated accuracy is above a predetermined threshold.

For example, if the information requested on the context parameter relating to the consumer device is the value of the outdoor ambient temperature, if the value of the outdoor ambient temperature available for the nearby provider device is 28° C. with an accuracy of ±2° C. and if the consumer device with the nearby provider device are estimated to be within an isothermal area, at block 206 the context platform 100 will return to the requesting entity a result containing the information available for the nearby provider device as it is (value of outdoor ambient temperature=28° C.±2° C.). If the requested information is the value of the position of the consumer device, instead, the context platform 100 will be adapted to estimate the position of the consumer device based upon the position of the nearby provider device and to calculate the accuracy of the estimated position.

For example, techniques to estimate the position of the consumer device based upon the position of the nearby provider device, that is techniques to calculate the accuracy of the estimated position, are known in the art from mathematics and statistics literature.

For example, the position of the consumer device can be estimated as the position of the nearby provider device plus the estimated distance $d_{est}$ between the two devices. The estimated distance $d_{est}$ between the two devices can be estimated based upon proximity-relevant information at disposal of the context platform 100 for the two devices and upon a suitable statistical distribution associated with the position of the consumer device. For example, it can be evaluated according to the following formula:

$$d_{est} = \sigma * d \quad (1)$$

wherein σ is the standard deviation of the statistical distribution and d represents the maximum possible distance (worst case) obtainable between the two devices with the technology used by the context platform 100 to obtain the proximity-relevant information. For example, in case of GSM/UMTS technology, d can represent the GSM/UMTS cell radius, in case of Bluetooth technology, d can represent the maximum Bluetooth range, in case of Wi-fi technology d can represent the maximum Wi-fi range, and similar. The statistical distribution averages the worst case, according to a certain value of probability.

For example, when the consumer device and the nearby provider device are within a same GSM/UMTS cell and in case of Gaussian distribution (also called normal distribution) for the position of the consumer device, the standard deviation σ is equal to 0.68, indicating that there is a 68% probability that the position of the consumer device is within a circle having centre in the position given for the nearby provider device and as radius the estimated distance $d_{est}$.

The accuracy of the value of the position estimated for the consumer device ($Acc_{cd}$) can be evaluated based upon the accuracy of the position of the nearby provider device ($Acc_{nd}$) using the following formula:

$$Acc_{cd} = Acc_{nd} + d_{est} = Acc_{nd} + \sigma * d \quad (2).$$

In general, the accuracy of the information on a vector of context parameters estimated for a consumer device ($Acc_{cd}$) can be evaluated based upon the accuracy of the information known for the nearby provider device ($Acc_{nd}$) using the following formula:

$$Acc_{cd} = Acc_{nd} + f(\sigma, p) \quad (3)$$

wherein p is a vector representing possible proximity parameters between the consumer device and the nearby provider device for the specific context parameters; σ is a vector of standard deviations of statistical distributions associated with the context parameters; and f is a propagation function of the accuracy.

It is noted that the accuracy ($Acc_{cd}$) of the information on a context parameter estimated for the consumer device is not necessarily worse than the accuracy of the information already known for the consumer device. As a matter of fact, in certain cases it can also improve. For example:
- if consumer device B has a GSM stack so that the it can be localized only based upon the identifier (CGI) of the GSM cell serving the device B (that can have a cell radius of the order of some Kms);
- if provider device A has a GPS stack, and
- if devices A and B are in Bluetooth proximity, the accuracy of the position of B, estimated based upon the GPS position of A and the maximum Bluetooth range of distances between device A and B, is better than the accuracy of the position of B, determined based upon information available from the GSM stack of device B.

As stated above, at block 203 the context propagation provider 110 verifies if, relevantly to the context parameter for which information has been requested, there is at least one nearby provider device 10 of the telecommunication system, which—according to predetermined proximity rules—can be considered in the proximity of the consumer device 10.

According to the invention, the proximity between two devices can be either a physical proximity or a logical proximity. The physical proximity can be determined based upon a distance relationship between the two devices, which can be evaluated, for example, in meters. The logical proximity, instead, can be determined by taking into consideration other proximity relationships as, for example, the numbers of hops of a telecommunication network linking two devices or taking into account if two devices belong to a same buddy list or to a same VPN (virtual private network), or similar.

The physical or logical proximity can be determined with reference to the present time or to a given time in the past. The reference to a given time in the past can be useful for providing context-based services wherein past temporal proximity between two devices is required (e.g., off-line context-tagging based services).

Moreover, according to the invention, the proximity between two devices is a relative term, which is established by applying proximity rules that depend upon the context parameter under consideration. In fact, as stated above, according to the proximity rules a device X, which is 1 Km faraway from device Y, could be considered to be in the proximity of device Y as far as the city weather forecast context parameter concerns. With regard to an indoor ambient temperature context parameter, instead, device X could be considered not in the proximity of device Y.

To perform the check at block 203 the context propagation provider 110 evaluates the proximity relationships (e.g., physical distance or belongingness to a given VPN or buddy list) between the consumer device 10 and the other devices 10 of the telecommunication system and applies the proximity rules to determine if, taking into account the evaluated proximity relationships, there is at least one nearby provider device 10 of the telecommunication system that can be considered in the proximity of the consumer device 10 with regard to the context parameter under consideration.

The proximity relationships can be evaluated by the context propagation provider 110 based upon proximity-relevant information available for the consumer device and for the other devices 10 of the telecommunication system.

Examples of proximity-relevant information can be:
- a map of GSM/UMTS cells of a mobile network and the identifiers of the GSM/UMTS cells wherein the consumer device and the other devices are located, from which the physical distance between the devices can be estimated through suitable statistical distributions associated to the context parameter at issue as, for example, explained above with reference to formula (1). Moreover, if the two devices are in a same GSM/UMTS cell it can be inferred that they will be at an approximate distance ranging inside that cell, for example, from 0 to some Kms;
- the lists of Bluetooth devices discovered by the consumer device and the other devices, from which the physical distance between the consumer device and the discovered devices can be estimated through suitable statistical distributions associated to the context parameter at issue as, for example, explained above with reference to formula (1). Moreover, from the list of the consumer device it can be inferred that the physical distance between the consumer device and the discovered device(s) will be at an approximate distance ranging, for example, from 0 to 10 m (depending on the Bluetooth classes of the devices). Furthermore, when the consumer device and another device have both discovered a same device or a same device discovered by a third device, it can be inferred that they will be at an approximate distance ranging, for example, from 0 to 10 m (depending on the Bluetooth classes of the devices);
- the list of Wi-Fi networks/APs (Access Points) discovered by the consumer device and the other devices, from which the physical distance between the consumer device and the other devices can be estimated through suitable statistical distributions associated to the context parameter at issue as, for example, explained above with reference to formula (1). For example, if two devices have both discovered a same Wi-Fi network or if they have discovered the same Wi-Fi network discovered by a third device, it can be inferred that they will be at an approximate distance ranging, for example, from 0 to 100 m (depending on the Wi-fi power class of the devices);
- the IP addresses of the network cards associated with the consumer device and the other devices from which the network distance (e.g. same sub-network or Intranet or VPN or Internet, . . . ) can be determined (e.g., as number of hops linking the two devices);
- the buddy lists associated with the consumer device and the other devices from which the logical proximity between devices/users can be evaluated;
- the lists of devices belonging to a same VPN from which the logical proximity between devices can be evaluated;
- the GPS coordinates of the consumer device and the other devices (from which the physical distance between the devices can be determined).

In view of the above, the proximity module 114 will be adapted to keep the proximity-relevant information associated with the devices 10 of the telecommunication system up-to-date. Moreover, the propagation module 112 will be adapted to store and execute the proximity rules.

Furthermore, each device 10 will be advantageously associated with at least one hardware and/or software proximity-indicator element (e.g., a network card/interface, a GPS chip, a Bluetooth stack, a Wi-Fi stack, a WiMAX stack, a NFC stack, a GSM/UMTS stack) that allows associating with the corresponding device proximity-relevant information useful to determine a proximity relationship between the corresponding device and another device.

For example, if the consumer device and a provider device are both associated with a GSM/UMTS stack, the context propagation provider 110 will be enabled to evaluate a proximity relationship between the consumer device and the provider device depending upon the GSM/UMTS cell currently occupied by the devices.

According to another example, the context propagation provider 110 will be enabled to estimate a physical distance between a consumer device and a provider device when the consumer (or provider) device is equipped with a GPS chip and the provider (or consumer) device is equipped with a Bluetooth stack and, at the same time, is in the proximity of a Bluetooth totem (the position of which is known to the context platform 100).

Accordingly, the check at block 203 will be advantageously performed by:
- verifying at the proximity module 114 the availability of proximity-relevant information useful to evaluate a proximity relationship between the consumer device and other devices 10 of the telecommunication system,
- in case of availability, evaluating the proximity relationship between the consumer device and the other devices 10 of the telecommunication system for which useful proximity-relevant information is available,
- applying the proximity rules to establish if, taking into account the evaluated proximity relationships, there is at least one device that can be considered in the proximity of the consumer device with regard to the context parameter under consideration.

The table below shows an example of proximity rules versus the physical distance between device A and device B, for different context parameters. As stated above, the physical distance may be evaluated based upon proximity-relevant information at disposal for the two devices A and B.

Proximity rules (e.g., can A and B be considered in the proximity of each other as far as concerns the specific context parameter?) versus physical distance between A and B

| | Physical distance | | |
|---|---|---|---|
| Context parameter | 0-100 m | 100-999 m | 1-10 Km |
| GPS position | YES | YES | YES |
| List of BT devices | YES | NO | NO |
| List of Wi-Fi networks | YES | YES | NO |
| Outdoor ambient temperature | YES | YES | YES |
| City weather forecast | YES | YES | YES |
| Indoor ambient temperature | YES | NO | NO |
| Indoor noise level | YES | NO | NO |
| Outdoor Pollution level | YES | YES | YES |

From the above description it will be evident that, according to the invention, when information on a context parameter relating to a consumer device A is not available, for example because device A is not equipped or associated with a sensor adapted to acquire data useful to determine said information or because the sensor is momentarily not operative, said information can be obtained as well if—with regard to the context parameter in question—there is at least one nearby provider device in the proximity of device A which is equipped or associated with a sensor adapted to provide data useful to estimate the information requested for device A.

For example, given two devices A and B both equipped with GSM stack (e.g., two cellular phones), for which the current physical distance can be estimated based upon the GSM identifiers of the cells wherein they are currently located, information on a context parameter available for one of the two devices can be propagated to the other one if A and B can be considered, according to the proximity rules, in the proximity of each other as far as concerns the specific context parameter. Accordingly, if device B is without sensors, device A is also equipped with a GPS chip and an outdoor ambient temperature sensor, and devices A and B can be considered in the proximity of each other as far as concerns the position and outdoor ambient temperature context parameter, the position of B and the ambient temperature of B can be respectively estimated based upon the GPS position of A and the outdoor ambient temperature sensed by the sensor of A. The device B or the service provider 12 is, thus, enabled to provide the user of device B with a service, based on the position and outdoor ambient temperature thus obtained for device B.

According to another example, devices A and B both have a Bluetooth stack and a Wi-Fi stack but B has the Wi-Fi sensor momentarily off. In this case, if A and B can be considered in the proximity of each other as far as concerns the Bluetooth context parameter, they can be also considered in the proximity of each other as far as concerns the context parameter of the list of Wi-Fi APs discovered by A. Therefore, the information about the list of Wi-Fi APs discovered by A can be associated also with device B so that the service provider 12 has the possibility of offering to B Wi-Fi advertisements of the type "if you turn your Wi-Fi application on you can navigate for 1 EUR a day".

Accordingly, the invention in the various aspects thereof allows enhancing the capacity of providing context-based services to a user. In particular, it allows increasing user's possibility of taking advantage of context-based services beyond the number and type of sensors associated with the user's devices.

Figure 4:
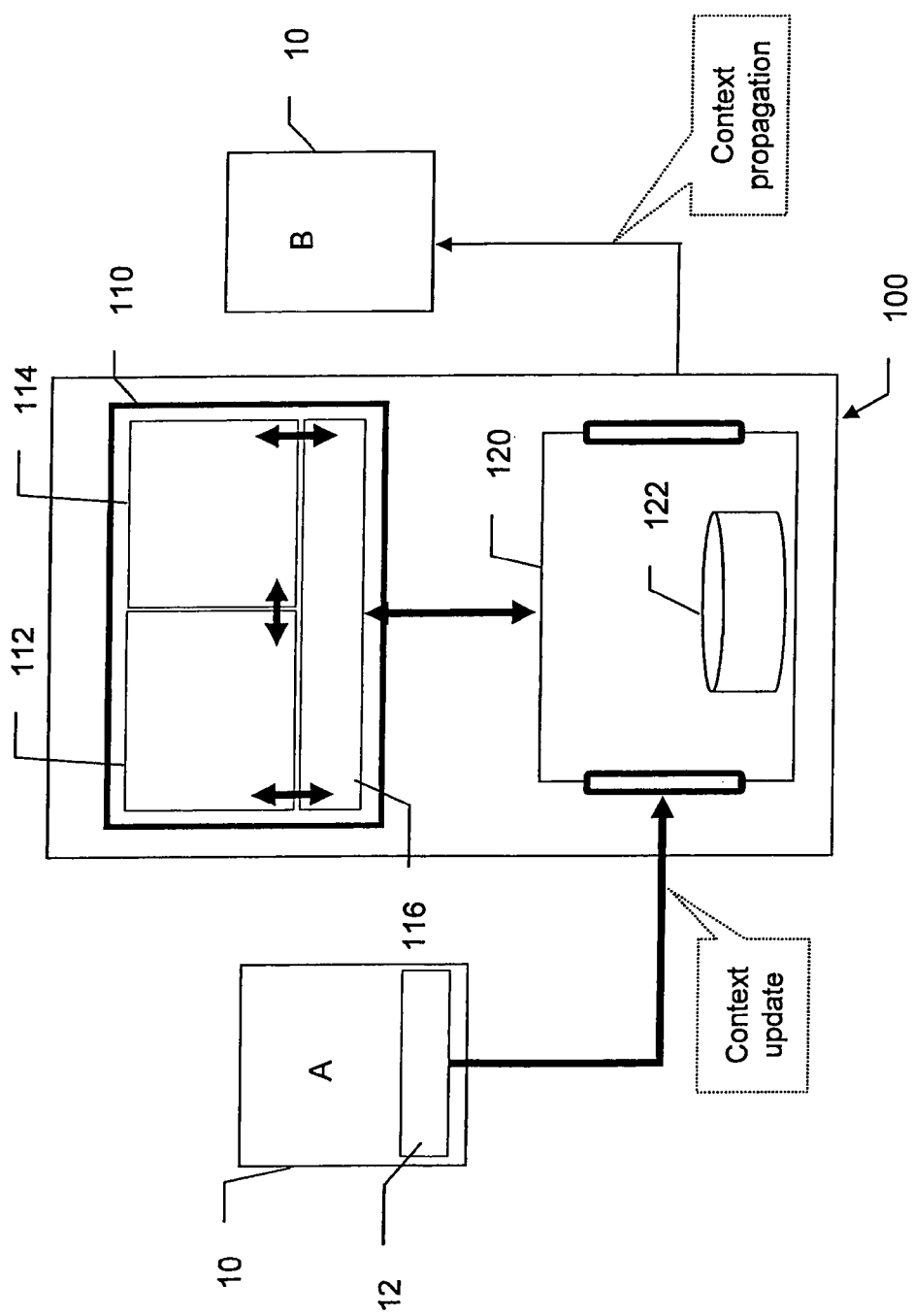
FIG. 4 schematically shows a context update and a context propagation operation according to a first embodiment of the invention.
Figure 5:
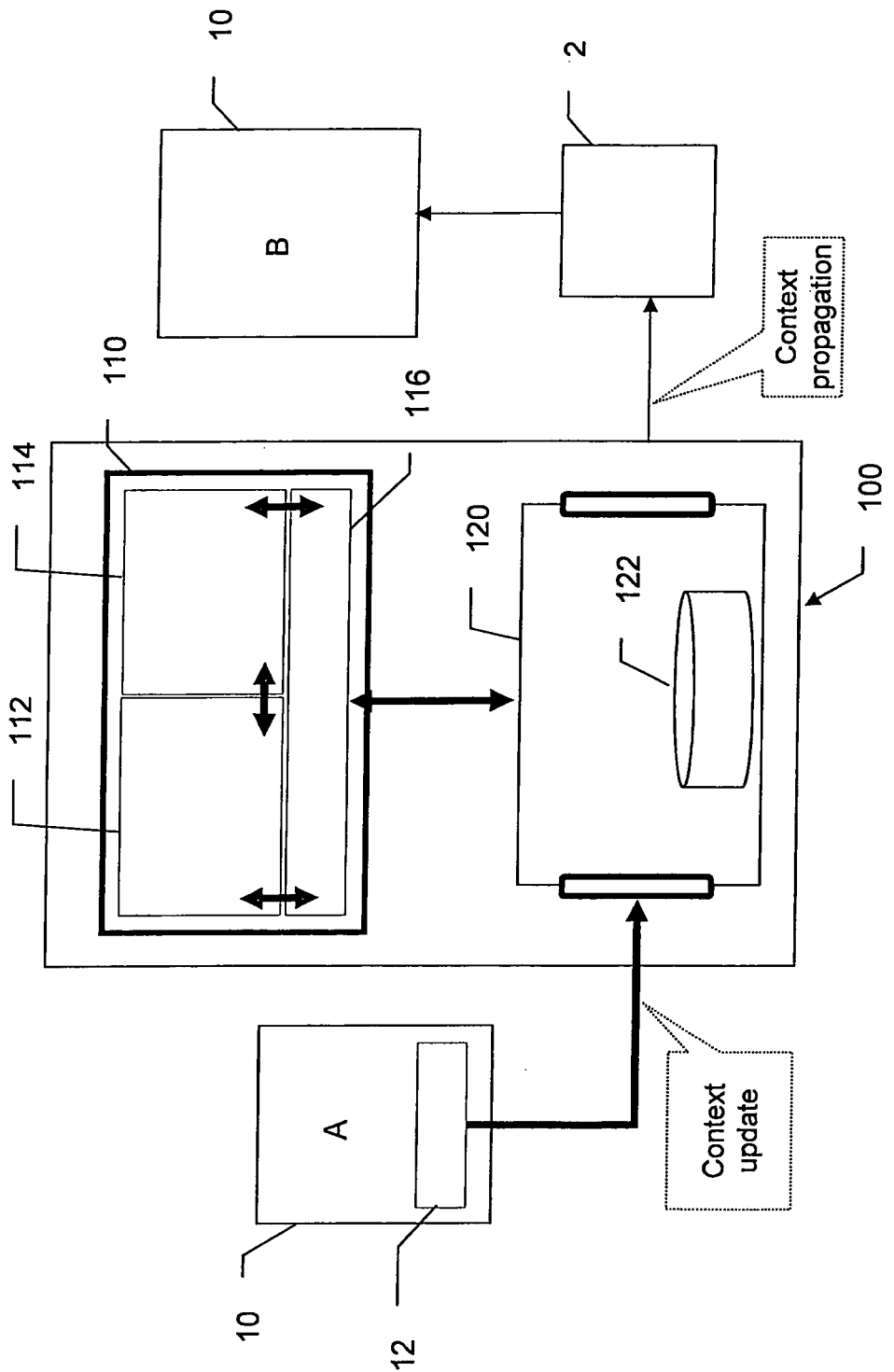
FIG. 5 schematically shows a context update and a context propagation operation according to a second embodiment of the invention.

The concept of context propagation from a device A to device B according to the invention is schematically shown in FIGS. 4 and 5.

In particular, FIGS. 4 and 5 show the situation of a provider device A and a consumer device B, wherein consumer device B is without sensors and provider device A has at least one context sensor to acquire data relevant to a predetermined context parameter and wherein, according to the proximity rules, devices A and B are in the proximity of each other as far as concerns said predetermined context parameter.

Device A sends (periodically and/or by request of the context broker 120) the data acquired by the at least one context sensor to the context broker 120 of the context platform 100 (operation referred to as "context update" in FIGS. 4 and 5).

According to the invention, the context platform 100 can obtain, as disclosed above, information on said predetermined context parameter relatively to device B, based upon the data available for device A. The information so obtained relatively to device B can be supplied to device B, as shown in FIG. 4, or to the service provider 2, as shown in FIG. 5 (operation referred to in FIGS. 4 and 5 as "context propagation"). The latter will then be adapted to use the received information to provide a predetermined context-based service to the user of device B.

The invention claimed is:
1. A method for providing information on a context parameter relating to a consumer device of a telecommunication system comprising a plurality of provider devices, comprising:
   a1) storing predetermined proximity rules configured to determine, based on context parameters and proximity relationships, whether the plurality of provider devices can be considered in the proximity of the consumer device,
  a) checking if data relevant to the context parameter are available for the consumer device;
  b) in a positive case of a), obtaining information on the context parameter relating to the consumer device based upon available data;
  c) in a negative case of a), determining said proximity relationships between the consumer device and the provider devices by using proximity-relevant information associated with the consumer device and provider devices, and checking, according to the predetermined proximity rules, if among the plurality of provider devices, there is at least one nearby provider device that, with regard to said context parameter, is in proximity of the consumer device;
  d) in a positive case of c), checking if data useful to determine the information on the context parameter relating to the consumer device are available for said at least one nearby provider device; and
  e) in a positive case of d), determining context information on the consumer device based upon data available for said at least one nearby provider device.

2. The method according to claim 1, wherein the consumer device comprises at least one proximity-indicator element that allows associating therewith said proximity-relevant information.

3. The method according to claim 2, wherein said at least one proximity-indicator element is selected from: a protocol stack and a communication protocol stack.

4. The method according to claim 1, wherein each of at least part of the plurality of provider devices comprises at least one proximity-indicator element that allows associating with the provider device said proximity-relevant information.

5. The method according to claim 1, wherein, in c), the proximity rules are applied to establish if, taking into account the determined proximity relationships, there is at least one nearby provider device that, with regard to the context parameter, can be considered in the proximity of the consumer device.

6. The method according to claim 1, wherein at least one device of the plurality of provider devices is associated with at least one context sensor capable of being adapted to acquire data indicative of at least one context parameter relating thereto or to the user operating the device.

7. The method according to claim 1, wherein c) further comprises, c1) checking if predetermined propagation criteria are met for the at least one nearby provider device in the proximity of the consumer device.

8. The method according to claim 7, wherein d) and e) are performed in a positive case of c1).

9. The method according to claim 1, wherein c), d) and e) are also performed in a positive case of a).

10. The method according to claim 1, wherein determining said proximity relationships comprises determining whether said proximity relationships comprise one of: a physical proximity relationship and a logical proximity relationship.

11. The method according to claim 1, wherein determining said proximity relationships comprises taking account of at least one of: a physical distance, a number of hops of the telecommunication network, being part of a buddy list, and being part of a virtual private network.

12. The method according to claim 1, wherein the proximity-relevant information comprises at least one of: a telecommunication identifier, a telecommunication address, a map of GSM/UMTS cells of the telecommunication network, a list of Bluetooth devices discovered by the consumer device, a list of Bluetooth devices discovered by the provider devices, a list of Wi-Fi networks or access points discovered by the consumer device, a list of Wi-Fi networks or access points discovered by the provider devices, a buddy list associated with the consumer device, a buddy list associated with the provider devices, a list of devices belonging to a same virtual private network, GPS coordinates of the consumer device, and GPS coordinates of the provider devices.

13. A context platform of a telecommunication system, comprising:
  modules configured to receive from an entity a request for information on a context parameter relating to a consumer device of the telecommunication system;
  modules configured to check if data relevant to the context parameter are available for the consumer device; in a positive case, to obtain the information on the context parameter relating to the consumer device based upon available data and to provide the entity with obtained information;
  modules configured to keep up-to-date, proximity-relevant information associated with the consumer device and with a plurality of provider devices of the telecommunication system;
  modules configured to determine proximity relationships between the consumer device and a plurality of provider devices, based on the proximity-relevant information;
  modules configured to store predetermined proximity rules for determining whether the plurality of provider devices can be considered within the proximity of the consumer device, and apply the predetermined proximity rules to check if, among a plurality of provider devices of the telecommunication system, there is at least one nearby provider device that, with regard to said context parameter, is in proximity of the consumer device; and
  modules configured to check if data useful to determine the information on the context parameter relating to the consumer device are available for said at least one nearby provider device; to determine, in a positive case, context information on the consumer device based upon data available for said at least one nearby provider device and to provide the entity with the context information so determined on the consumer device.

14. A telecommunication system comprising at least one consumer device, a plurality of provider devices and a context platform according to claim 13.

* * * * *